United States Patent
Chacko

(10) Patent No.: US 6,686,033 B1
(45) Date of Patent: Feb. 3, 2004

(54) WATERBORNE COMPOSITION EXHIBITING SOUND DAMPING PROPERTY AT LOW AND HIGH FREQUENCIES

(75) Inventor: John M. Chacko, Harrison, MI (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 194 days.

(21) Appl. No.: 09/883,746

(22) Filed: Jun. 18, 2001

Related U.S. Application Data

(60) Provisional application No. 60/288,887, filed on Dec. 27, 2000.

(51) Int. Cl.[7] ................................................. B32B 1/00
(52) U.S. Cl. .................. 428/221; 525/239; 525/241; 524/847; 524/445; 427/447; 427/487
(58) Field of Search ................................. 525/221, 241, 525/239; 524/847, 445; 427/447, 487; 428/221

(56) References Cited

U.S. PATENT DOCUMENTS

| | | | |
|---|---|---|---|
| 4,282,131 A | 8/1981 | Trousil | 260/29.7 R |
| 4,346,782 A | 8/1982 | Bohm | 181/207 |
| 4,760,108 A * | 7/1988 | Asano et al. | 524/451 |
| 4,836,871 A * | 6/1989 | Kato | 156/79 |
| 4,956,103 A | 9/1990 | Jessop et al. | 210/787 |
| 6,130,284 A | 10/2000 | Singh | 524/495 |

* cited by examiner

Primary Examiner—James J. Seidleck
Assistant Examiner—Thao Tran
(74) Attorney, Agent, or Firm—Bin Su

(57) ABSTRACT

It is disclosed a wateborne composition comprising styrene-acrylic latex having a glass transition temperature (Tg) of from about 0° C. to about 30° C., vinylidene chloride-containing polymer latex and at least one filler. The composition exhibits sound damping property at both low and high frequencies as well as chip resistance and abrasion resistance. The composition is effective for use in the transportation industry, the building industry, the aerospace industry and the appliance industry.

24 Claims, 2 Drawing Sheets

WATERBORNE COMPOSITION EXHIBITING SOUND DAMPING PROPERTY AT LOW AND HIGH FREQUENCIES

This application claims benefit of provisional application No. 60/288,887 filed Dec. 27, 2000.

BACKGROUND OF THE INVENTION

1. Field of the Invention

The invention relates to a waterborne composition comprising styrene acrylic latex, vinylidene chloride-containing polymer latex and filler, which exhibits excellent sound damping property at both low and high frequencies.

2. Description of the Related Art

Various vibration and/or sound damping and corrosion resistant compositions for use on coating metal substrates are commercially available.

U.S. Pat. No. 4,952,610 discloses a sound damping composition comprising a urethane polymer, an oil-insoluble olefin polymer, and a filler. The composition can be used for damping noise in the frequency range of from about 50 Hz to about 5,000 Hz at a temperature of from about 150° F. to about 350° F.

U.S. Pat. No. 4,282,131 discloses a water based car underbody coating composition comprising a butadiene styrene latex, mica, and other additives. The composition is used for undercoating of vehicles to prevent corrosion and may exhibit, upon forming a film of high solid content, some sound or noise insulation.

U.S. Pat. No. 4,346,782 discloses a method of producing a vibration and sound damping coating that exhibits a sound damping property in a low frequency range of from about 20 to 1,000 Hz. The materials used in the method are plastisols based on polymers such as vinyl chloride polymers, acrylic polymers and liquid polyamide epoxide.

U.S. Pat. No. 6,130,284 discloses a vibration damping system comprising a substrate coated with a composition that exhibits sound damping property at a temperature of from about 0° C. to about 60° C. The composition comprises butyl rubber, a tackifying resin, a pigment and substantially spherical microspheres.

However, there is still a need for a high performance sound damping composition that exhibits excellent sound damping effect at a broader sound frequency range while retaining other desirable properties such as good chip resistance and abrasion resistance.

SUMMARY OF THE INVENTION

In one aspect, the invention provides a waterborne composition comprising:

a) from about 20 wt % to about 40 wt % of a styrene-acrylic latex having a glass transition temperature (Tg) of from about 0° C. to about 30° C.;

b) from about 5 wt % to about 20 wt % of a vinylidene chloride-containing polymer latex; and c) from about 20 wt % to about 60 wt % of at least one filler, wherein said composition exhibits a composite loss factor of from about 0.02 to about 0.30 at a frequency of from about 100 Hz to about 1,400 Hz at a temperature of from about −5° C. to about 55° C.

In another aspect, the invention provides an article comprising a substrate and a coating formed from the composition of the invention disposed on at least one surface of the substrate.

In yet another aspect, the invention provides a method of improving the sound damping of a substrate, comprising a step of applying the composition of the invention to at least one surface of the substrate to form a coating thereon. The coating may be air-dried at low temperature such as ambient temperature to up to 200° F.

The composition of the invention can be formulated to exhibit excellent sound damping properties at low frequency, i.e., no greater than 1,000 Hz as well as at high frequency, i.e., from greater than 1,000 Hz to about 10,000 Hz at a temperature of from about −5° C. to about 55° C.

The composition of the invention can also be formulated to be light weight, i.e. the specific gravity of the composition ranges from about 1.0 to about 1.5.

The composition of the invention can also be formulated to exhibit high chip resistance. In some embodiments the composition exhibits a chip resistance of rating 10.

The composition of the invention can also be formulated to exhibit abrasion resistance of at least 40 Kg.

The composition of the invention can also be formulated to exhibit very good adhesion when applied onto a substrate, such as cold rolled and galvanized steel, primed and painted steel, aluminum and painted aluminum, sheet molding compound (SMC), fiber glass and other plastics.

The composition of the invention can be used in a number of applications, including the transportation industry, the building industry, the aerospace industry and the appliance industry. The applications in the transportation industry generally include those parts of the vehicle which are subject to high structural noises (i.e., low frequency) and air borne noises (i.e., high frequency), which include the underbody parts, quarter panels, roofs, doors, interior, floor pan and wheel house.

DETAILED DESCRIPTION OF THE INVENTION

Figure 1:
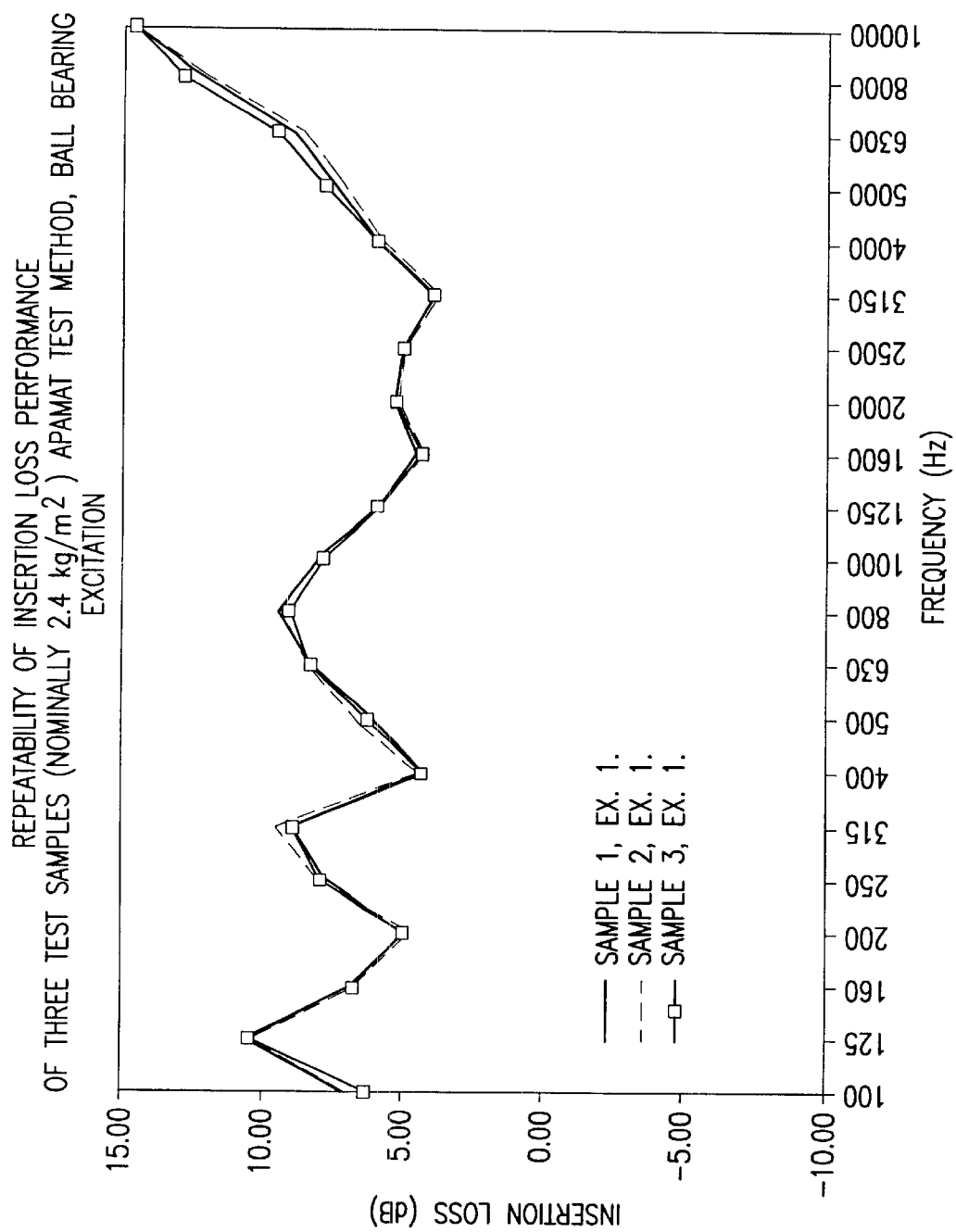
FIG. 1 depicts the Insertion Loss performances of three samples of Example 1 according to APAMAT II test method using ball bearing excitation.

The waterborne composition of the invention comprises at least one styrene-acrylic latex, at least one vinylidene chloride-containing polymer latex, and at least one filler.

Styrene acrylic lattices useful in the composition of the invention are lattices containing emulsified or suspended in an aqueous medium particles of polymers wherein the polymers are copolymers of styrene and at least one acrylic monomer such as n-butyl acrylate, n-butyl methacrylate, 2-ethylhexyl acrylate, 2-ethylhexyl methacrylate, and acrylonitrile. Examples of useful styrene acrylic lattices include styrene acrylic lattices commercially available under trade designation PN-3823-H from H. B. Fuller Company, St. Paul, Minn.; Acronal® series from BASF, Charlotte, N.C.; and Rhoplex® from Rohm & Haas. The preferred styrene acrylic latex has a glass transition temperature (Tg) of from about 0° C. to about 30° C., more preferably, from about 15° C. to about 25° C. Styrene acrylic latex is present in the composition of the invention, preferably, in an amount of form about 20% to about 40% by weight, more preferably, from about 25% to about 35 by weight, based on the total weight of the composition.

Useful vinylidene chloride-containing polymer lattices are lattices containing emulsified or suspended in an aqueous medium particles of polymers wherein the polymers are copolymers and terpolymers of vinylidene chloride and at least one acrylic monomer such as n-butyl acrylate, n-butyl methacrylate, 2-ethylhexyl acrylate, 2-ethylhexyl methacrylate. The preferred vinylidene chloride-containing polymer lattices include vinylidene chloride/vinyl chloride/acrylic terpolymer latex. Examples of commercially available vinylidene chloride-containing polymer lattices include Haloflex 202 from Zeneca Resins; Permax® 803 from B F Goodrich Specialty Chemicals; Polidene 33-055 from Scottbader; and Daratak® XB-3631 from W. R. Grace. The vinylidene chloride-containing polymer lattices is present in the composition of the invention, preferably, in an amount of from about 5.0% to about 20% by weight, more preferably, from about 8% to about 12% by weight, based on the total weight of the composition.

The filler is preferably selected to improve the sound damping property of the composition as well as other properties such as chip resistance, abrasion resistance, and corrosion resistance. Examples of useful filler include varieties of mica, e.g., mica fractionated shell and phlogopite mica; talc; clay; calcium carbonates; barytes (barium sulfate); graphite, and mixtures thereof.

A combination of various fillers can be used in the composition of the invention to impart a variety of properties to the coatings. For example, when a coating with a high level of sound damping is desired, the composition preferably includes a combination of any of the following fillers: calcium/magnesium carbonates, calcium carbonates, talc, mica and barytes. When a coating with a high level of chip resistance is desired, the composition preferably includes a combination of calcium/magnesium carbonate and talc. When a coating with high level of corrosion resistance is desired, the composition preferably includes a combination of a metal phosphate, e.g., zinc phosphate, and mica or talc. In the most preferred compositions of the invention, the filler includes mica or a combination of mica and talc. Useful commercially available fillers include Marble Dust from Imery's, Rosewell, Ga.; Snowhite from Omya, Perth, Canada; Dolocron from Specialty Minerals, New York, N.Y.; RC-32 clay from Thiele Kaolin Company, Sandersville, Ga.; 4-K Mica from KMG Minerals, Kings Mountain, N.C.; 5000 Series Mica from Polar Minerals, Mt. Vernon, Ind.; Suzorite Mica from Suzurite Mineral Products, Boucherville,Canada; and Vertal talc from Luzenac America Inc., Englewood, Colo. The filler in the composition is present in an amount of from about 20% to about 60% by weight, preferably from about 35% to about 45% by weight, based on the total weight of the composition.

Optionally, the composition of the invention may include at least one hydrocarbon resin latex. Examples of useful hydrocarbon resins include aliphatic hydrocarbon resins, such as rosin and rosin esters. Preferred commercially available hydrocarbon resins include Aquatac from Arizona Chemicals, Panama City, Fla.; Permatac from Nevelle Alliance, Pittsburg, Pa. Preferably, the hydrocarbon resin is present in the composition in an amount of from about 5.0% to about 15% by weight, more preferably from about 8% to about 12% by weight, based on the total weight of the composition.

The composition of the invention may also include substantially spherical microspheres of fine particles. Substantially spherical microspheres or fine particles are useful in the invention because of their light weight. They may be useful in providing bulk, controlling viscosity, increasing cohesive strength and so forth. There are various kinds of fine particles or microspheres that could find use in the present invention. They include, hollow, substantially spherical, or fine particles of ceramic, polymeric and glass, and mixtures thereof. Examples of useful commercially available microspheres include Dualite from Pierce and Stevens, Buffalo, N.Y.; Extendosphere SF and Q-CEL from The PQ Corporation, Valley Forge, Pa.; Fillite 150 & 100 from Fillite, Atlanta, Ga.; and Scotchlite Glass Bubbles K Series from 3M, St. Paul, Minn. The microspheres are present in the composition in an amount of from about 0.5% to about 5.0% by weight, preferably from about 1.0% to about 3.0% by weight, based on the total weight of the composition.

The composition of the invention may include other optional ingredients such as additives typically used in the waterborne paint and adhesive compositions to further customize the composition. These ingredients are generally used in the amounts that do not adversely alter the desirable properties of the composition and may further depend on the end use of the composition. Examples of useful additives include thickeners, dispersants, surfactants, pigments, defoamers, preservatives, plastisizers, antifreeze, pH modifiers, and coalescing solvent. Although these ingredients used in the invention may be characterized as useful for specific functions, it should be understood that these ingredients are not limited to their typical functions and thus will be used generally in the invention to provide desirable properties to the composition.

Plasticizers are generally used with other resins to obtain flexibility and cohesive strength. Examples of useful plasticizers include phthalates and adipates. Commercial available plasticizers include Benzoflex 2088 from Velsicol Chemical Corp., Rosemont, Ill. and Santisizer from Solucia, St.Louis, Mo. The preferred amount of the plasticizer is from about 1.0% to about 5.0% by weight, based on the total weight of the composition.

Defoaming agents are preferably used in the waterborne coating compositions of the invention to prevent or reduce the amount of foaming during formulation and application. Typical defoaming agents are well known in the waterborne paint industry. The waterborne coating compositions of the invention preferably include an amount of a defoaming agent effective to keep the amount of foam produced during formulation to a low level such that it does not adversely affect the performance properties of the coating of the invention. Preferably, the waterborne coating compositions of the invention include from about 0.1% to about 1.0% by weight, based on the total weight of the composition, of a defoaming agent.

Dispersants and surfactants can be used in the compositions of the invention to assist in the dispersion of fillers, pigments, emulsions, etc. Useful dispersants and surfactants include inorganic polyphosphates such as potassium tripolyphosphate (K5P3O10), organic polyacids, and nonionic difunctional block copolymers. Preferably, a dispersant or surfactant is used in an amount effective to provide good wetting of the solids so that a homogeneously dispersed composition is formed that can be generally evenly applied to surfaces at a variety of thickness. More preferably, a dispersant or surfactant is used in an amount of from about 0.2% to about 2.0% by weight, based on the total weight of the composition.

A pigment or combination of pigments can also be used in the composition of the invention to provide color. Among other properties, pigments can also be used to increase the solids content of the compositions and perform the function of a filler. Generally, any alkali stable inorganic or organic pigment can be used in the compositions of the present invention. Examples of useful pigments in the present invention include carbon black dispersions. Commercially available pigments include Aurasperse from Engelhart Corp. (Iselin, N.J.); and Tint Ayd from Daniel Products Company (Jersey City, N.J.). Preferably, it is present in an amount of from about 0.2% to about 5.0% by weight, based on the total weight of the composition.

The compositions of the invention can also include preservatives, such as bacteriostatic agents, antimicrobial agents such as hexahydro-1,3,5-tris(2-hydroxyethyl)-s-triazine, autifungal agents, and the like. Preferably, a preservative is used in an amount of from about 0.005% to about 0.2% by weight, based on the total weight of the composition.

Although the composition of the invention is a waterborne composition, it can also include minor amount of organic solvents. For example, it can include solvents that act as film enhancers, i.e., that improve the flowability of polymer emulsion particles such that the emulsion more readily forms a film. Useful film enhancers include ester alcohols and glycol ethers. Preferably, a film enhancer is present in an amount sufficient to impart advantageous film-forming characteristics to the compositions of the present invention. More preferably, a film enhancer is present in an amount of from about 0.3% to about 1.0% by weight, based on the total weight of the composition.

The compositions of the invention can also include additives for adjusting or stabilizing the pH. Useful pH adjusting or stabilizing agent include those used in latex emulsion paints, including, e.g., 2-amino-2-methyl-1-propanol and ammonia. The pH adjusting additive or pH modifier is preferably present in an amount effective to achieve a composition having a pH of from about 7 to about 9, more preferably from about 7.5 to about 8.5. Typically the pH modifier is present in an amount of from about 0.05% to about 1.0% by weight, based on the total weight of the composition.

The composition of the invention is made by mixing the ingredients until a uniformly dispersed mixture is obtained. Any conventional mixing techniques can be used. The resultant composition is storage stable. That is, it can be stored for up to about 60 to about 90 days at about 60° F. to about 80° F. without significant separation and agglomeration of the ingredients. The composition of the invention can be applied to a surface of a suitable substrate using any conventional coating technique, such as spray coating or brushing.

In yet another aspect, the invention relates to a method of improving the sound damping property of a substrate. The method comprises a step of applying the sound damping composition of the invention to at least one surface of the substrate to form a coating thereon. Preferably, the coating is dried at ambient conditions for a period sufficient to dry the coating, preferably for about 72 hours. Alternatively, the coating can be dried at a low temperature, e.g, up to 200° F. for a period sufficient to dry the coating.

In yet another aspect, the invention provides an article comprising a substrate and a coating of the above-described composition disposed thereon. The useful substrate include steel, aluminum, sheet molding compound (SMC), fiber glass and other plastics. The article can be used in vehicles, such as cars, trucks or boats, appliances or other suitable structures that are subject to noises resulting from structural vibrations and air borne.

In general, the article of the invention finds application in the quarter panels, the roof, the door, the interior, the floor pan, and the wheel house of motor vehicles. In other applications, the article can be placed in a suitable position on the inside or outside of a structure e.g., a vehicle or an aircraft to provide maximum sound damping performance.

The composition of the invention can be formulated to exhibit excellent sound damping properties at both low frequency and high frequency. The sound damping property at low frequency, i.e., no greater than 1,000 Hz, is measured by composite loss factor according to SAE J1637, and generally ranges from about 0.02 to about 0.30 at temperatures of from about $-5°$ C. to about 55° C. The sound damping property at high frequency, i.e., from about 1,000 Hz to about 10,000 Hz, is measured by insertion loss according to APAMAT II test method, and generally ranges from about 4 dB to about 15 dB at temperatures of from about $-5°$ C. to about 55° C., preferably, at the temperature of about 25° C.

The composition of the invention can also be formulated to be light weight, i.e. the specific gravity of the composition ranges from about 1.0 to about 1.5.

The composition of the invention can also be formulated to exhibit high chip resistance. Chip resistant coatings are especially desirable by the automobile industry. The coatings protect the metal from paint cracking and rust in the areas exposed. Without these chip resistant coatings, the stones and other abrasive materials that are picked up and accelerated by passing vehicles against the painted bodies of nearby motor vehicles, tend to cause the paint on the bodies to chip, which exposes the underlying metal to rust and corrosion, and destroys the aesthetic effect of the smooth continuous paint on the vehicle. The composition of the invention exhibit a chip resistance of rating of from about 8 to about 10, as measured according to SAE J 400, when used as an underbody coating on the motor vehicles.

The composition of the invention can also be formulated to exhibit abrasion resistance. Preferably, the composition exhibits abrasion resistance of at least 40 Kg of brass nuts.

The composition of the invention can also be formulated to exhibit very good adhesion when applied onto a substrate, such as cold rolled and galvanized steel, primed and painted steel, aluminum and painted aluminum, sheet molding compound (SMC), fiber glass and most of the automotive top coats.

The composition of the invention also exhibits an elongation of from about 50% to about 75% when tested according to ASTM D 638.

The invention is further illustrated by the following non-limiting examples. All the percentages, parts, ratios and amounts stated herein are by weight unless otherwise specified.

Test Procedures

Test procedures used in the examples include the following.

Sound Damping Test Method

The sound damping property at low frequency, i.e., no greater than about 1,000 Hz, is tested according to the Engineering Society for Advancing Mobility Land Sea Air and Space, SAE J1637 for Laboratory Measurement of the Composite Vibration Damping Properties of Materials on a Supporting Steel Bar. The composite loss factors are measured at the temperatures indicated in Table 1. The test procedure is based on ASTM E 756-98 Standard Test Method for Measuring Vibration-Damping Properties of Materials and differs only in that the SAE J1637 specifies the supporting bar material, the bar size and the mounting conditions of the test sample.

Sound damping property at high frequency, i.e., from about 1,000 Hz to about 10,000 Hz is tested according to APAMAT II test method.

Chip Resistance Test Method I

Sample panels are prepared by spraying a 1.5 mm wet coating film of the composition onto a 100×300 mm cathodic electrocoated steel panel, a 100×300 mm base coat painted steel panel and a 100×300 mm base coat/clear coat painted steel panel, respectively. The panels are then air-dried at ambient conditions for about 72 hours. The samples are tested according to SAE J400 for Chip Resistance of Surface.

Chip Resistance Test Method II (i) Sample panels are prepared according to Chip Resistance Test Method I and then tested at ambient temperature using a gravelometer according to SAE J400 with 5 quarts of gravel.

(ii) Sample panels are prepared according to Chip Resistance Test Method I. The panels are then placed in a freezer at −18° F. for a minimum of one hour prior to being tested at the same temperature in a gravelometer according to SAE J400 with 1 quart of gravel.

Dry Time Test Method

The composition is uniformly coated on an electro coated steel panel and a base coat/clear coated steel panel at a thickness of 1.0 mm, respectively. The panels are air-dried for a minimum of three hours at ambient conditions. Then, water is sprayed on the panels at a maximum of 40 psi pressure.

Elongation Test Method

Elongation is tested according to ASTM D 638.

Abrasion Resistance Test Method

A 100×200×0.8 mm electrodeposited steel panel is washed and cleaned with isopropyl alcohol. A 1.5 mm wet coating film of the composition is sprayed on the panel and air-dried for 72 hours at ambient conditions to obtain a 1 mm film panel. The panel is tested by applying a cross cut on the coating surface of the panel, placing the panel on a Toyota abrasion tester, and then, dropping brass nuts on the cross cut area through the funnel at 3 kg intervals until the coating film is peeling off or abrades the coating on the panel, reporting the weight of brass nuts used to cause the failure.

EXAMPLE 1

A water-based composition was prepared by combining in a high speed mixer (500–1,000 rpm) 2.64% water; 0.20% potassium tripolyphosphate surfactant (FMC Corporation, Philadelphia, Pa.); 1.0% Propglycol antifreeze (Ashland Chemical, Dublin, Ohio); 0.50% Pluronic F87 surfactant, (BASF Corporation, Parsippany, N.J.); 0.20% Rhodoline 646 defoamer (Rhone-Poulenc,Lyons, FR); 3.0% Benzoflex 2088 plasticizer (Velzicol Chemical Corp., Rosemont, Ill.); 0.50% Aurasperse Carbon Black W-7017 (Engelhard Corp., Iselin, N.J.); 30% PN-3823-H styrene acrylic emulsion (H. B. Fuller (St. Paul, Minn.); 10% Haloflex 202 vinylidene chloride/vinyl chloride/acrylic terpolymer (Neo Resins, Wilmington, Mass.); 1.0% Dualite plastic microspheres (Pierce and Stevens, Buffalo, N.Y.); 1.0% Scotchlite Bubbles glass microspheres (3M, St. Paul, Minn.); 10% Suzorite Mica filler (Suzurite Mineral Company, Atlanta, Ga.); 10% Aquatac rosin ester dispersion (Arizona Chemical, Panama City, Fla.); 29% Vertal talc (Luzenac America, Englewood, Colo.); 0.01% Kathon LX 0.15% biocide (Rohm and Haas, Philadelphia, Pa.); 0.50% Texanol ester alcohol coalescing solvent (Eastman Chemical, Kingsport, Tenn.); 0.10% AMP-95 pH modifier (Angus Chemicals, Northbrook, Ill.); 0.20% Acrysol acrylic thickener (Rohm and Haas, Philadelphia, Pa.). The composition was mixed until smooth. The solid content was about 75%.

The composition was sprayed onto a 225 mm×12.7 mm×0.8 mm steel substrate to form a 200 mm long and 3 mm thick wet film of the coating on one side of the substrate and dried at 25° C. for about 7 days. The coating was then tested according to Sound Damping Test Method—SAE J16 37. The average composite loss factor of three samples is reported in Table 1.

Figure 2:
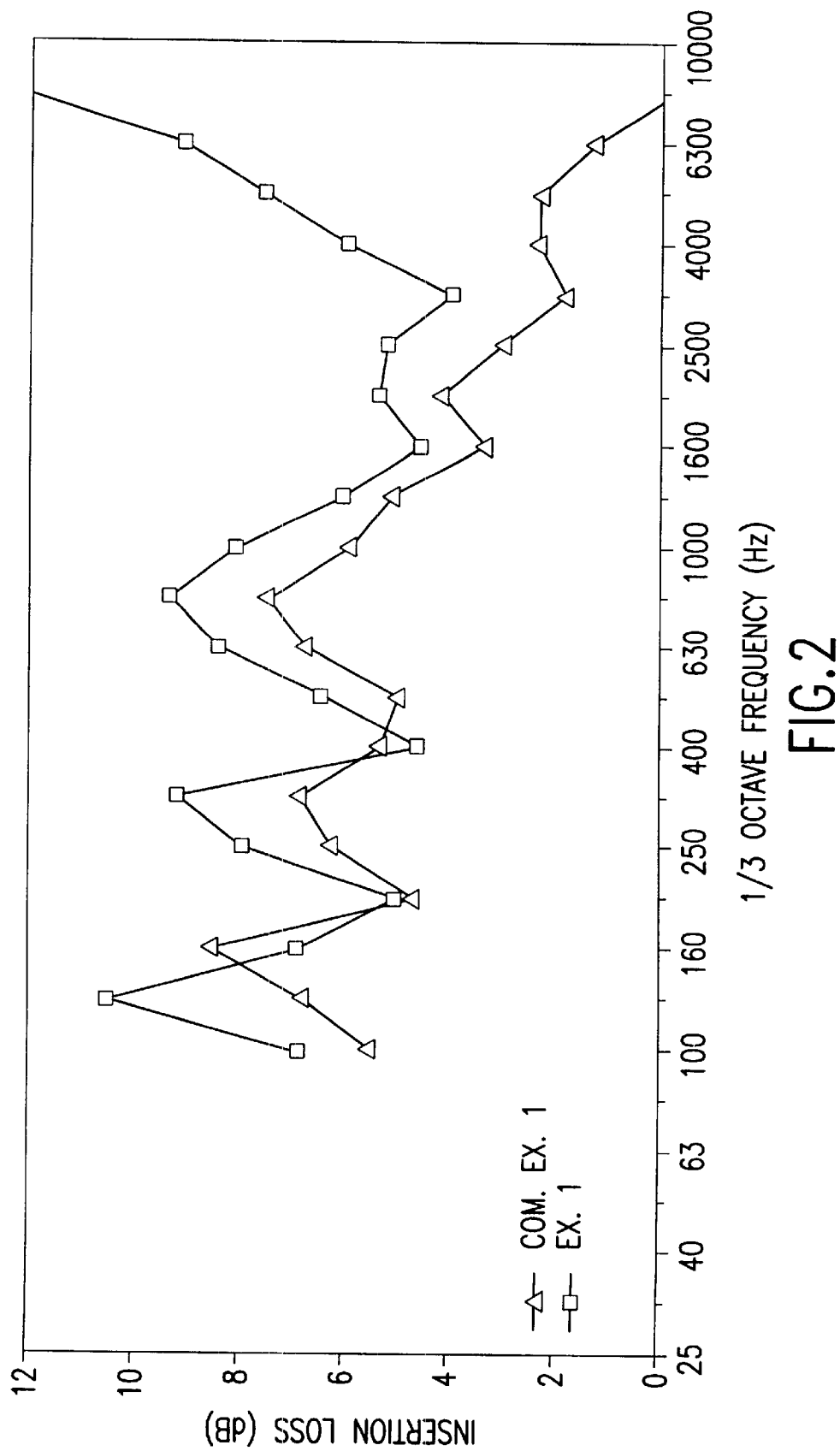
FIG. 2 depicts the comparison of the Insertion Loss performance of Example 1 and Comparative Example 1 according to APAMAT II test method using ball bearing excitation.

The composition was also applied by spraying onto a 840 mm×840 mm×0.5 mm steel panel to form a 3 mm thick wet film of the coating on one side of the panel and dried at ambient conditions for about 7 days. The coating was then tested according to Sound Damping Test Method—APAMAT II and the results are reported in FIGS. 1 and 2.

The composition was also tested according to Dry Time Test Method and Chip Resistance Test Method II. The results are reported in Tables 2 and 3, respectively.

EXAMPLE 2

A composition was prepared according to Example 1 except that no Aquatac was added.

The composition was sprayed onto a 225 mm×12.7 mm×0.8 mm steel substrate to form a 200 mm long and 3 mm thick wet film of the coating on one side of the substrate and dried at 25° C. for about 7 days. The coating was then tested according to Sound Damping Test Method—SAE J16 37. The average composite loss factor of three samples is reported in Table 1.

The composition was also tested according to Dry Time Test Method. The result is reported in Table 2.

Comparative Example 1

A composition was prepared according to Example 1 except that the following ingredients were used to form the composition: 6.83% water, 0.2% potassium tri polyphosphate surfactant (FMC), 0.7% propylene glycol antifreeze (Ashland Chemical, Dublin, Ohio); 0.7% Tamol dispersant (Rohm and Haas, Philadelphia, Pa.); 1.2% Attagel rheological additive (Engelhard Corp. Iselin, N.J.); 0.3% Rhodoline defoamer (Rhone-Poulenc, Lyons, FR); 0.4% Aurasperse Carbon Black dispersion (Engelhard Corp,Iselin,N.J.); 6% Butofan styrene butadiene emulsion (BASF, Charlotte, N.C.); 6% Styrofan styrene butadiene emulsion (BASF, Charlotte,N.C.); 6% Daratak, polyvinylidene chloride terpolymer emulsion (W. R. Grace, Lexington, Mass.); 6% Haloflex vinylidene chloride/vinyl chloride/acrylic terpolymer (Neo Resins, Wilmington, Mass.); 0.08% AMP-95 pH modifier (Angus Chemical, Northbrook, Ill.); 0.05% Onyxide 200 biocide (Stepan, Northfield, Ill.); 0.3% Texanol ester alcohol coalescing agent (Eastman Chemical, Kingsport, Tenn.); 0. 14%Pluronic surfactant (BASF, Parasippany, N.J.); 66% Snowhite calcium carbonate filler (Omya,Perth, Canada); and 0.3% Acusol acrylic thickener (Rohm and Haas, Philadelphia, Pa.). The solid content was about 80%.

The composition was sprayed onto a 225 mm×12.7 mm×0.8 mm steel substrate to form a 200 mm long and 3 mm thick wet film of the coating on one side of the substrate and dried at 25° C. for about 7 days. The coating was then tested according to Sound Damping Test Method—SAE J16 37. The average composite loss factor of three samples is reported in Table 1.

The composition was also sprayed onto a 840 mm×840 mm×0.5 mm steel panel to form a 3 mm thick wet film of the coating on one side of the panel and dried at ambient conditions for about 7 days. The coating was then tested according to Sound Damping Test Method—APAMAT II and the result is reported in FIG. 2.

The composition was also tested according to Dry Time Test Method. The result is reported in Table 2.

TABLE 1

Sound Damping Property at Low Frequency

| Temp. (° C.) | Resonant Frequency (Hz) | Composite Loss Factor ($\eta_c$) | | |
|---|---|---|---|---|
| | | Ex. 1 | Ex. 2 | Com. Ex. 1 |
| −5 | 200 | 0.035 | 0.027 | 0.023 |
| | 400 | 0.036 | 0.028 | 0.021 |
| | 800 | 0.037 | 0.030 | 0.022 |
| 10 | 200 | 0.094 | 0.045 | 0.051 |
| | 400 | 0.091 | 0.046 | 0.058 |
| | 800 | 0.079 | 0.047 | 0.052 |
| 25 | 200 | 0.241 | 0.152 | 0.110 |
| | 400 | 0.262 | 0.147 | 0.120 |
| | 800 | 0.243 | 0.138 | 0.142 |
| 40 | 200 | 0.127 | 0.240 | 0.082 |
| | 400 | 0.185 | 0.289 | 0.099 |
| | 800 | 0.221 | 0.265 | 0.126 |
| 55 | 200 | 0.055 | 0.093 | 0.047 |
| | 400 | 0.070 | 0.128 | 0.058 |
| | 800 | 0.083 | 0.197 | 0.076 |

TABLE 2

Dry Characteristics

| Ex. No. | Dry Conditions | Water pressure (psi) | Minimum Dry time To withstand all 3 pressures (hrs.) |
|---|---|---|---|
| Ex. 1 E-Coat* | 77° F./50% RH | 20, 30, 40 | 2.0 |
| BC/CC** | 77° F./50% RH | 20, 30, 40 | 2.0 |
| Ex. 2 E-Coat | 77° F./50% RH | 20, 30, 40 | 4.5 |
| BC/CC | 77° F./50% RH | 20, 30, 40 | 4.5 |
| Com. E-Coat | 77° F./50% RH | 20, 30, 40 | 5.0 |
| Ex. 1 BC/CC | 77° F./50% RH | 20, 30, 40 | 5.0 |

*E-Coat: electrodeposite coating
**BC/CC: base coat/clear coating

TABLE 3

Chip Resistant Property

| Test Method | Test Requirement | Test Result |
|---|---|---|
| Chip Resistance Test Method I | No chipping spots, rating of from 0 (poor) to 10 (best) | No chipping spots, rating of 10 |
| Chip Resistance Test Method II (i) | Material shall not exhibit flaking lifting or loss of adhesion from test panel | No flaking, lifting or loss of adhesion |
| Chip Resistance Test Method II (ii) | | No flaking, lifting or loss of adhesion |

What is claimed is:
1. A waterborne composition comprising
   a) from about 20 wt % to about 40 wt % of a styrene-acrylic latex having a glass transition temperature of from about 0° C. to about 30° C.;
   b) from about 5 wt % to about 20 wt % of a vinylidene chloride-containing polymer latex; and
   c) from about 20 wt % to about 60 wt % of a filler, wherein said composition exhibits a sound damping property as measured by a composite loss factor of from about 0.02 to about 0.30 at a frequency of from about 200 Hz to about 800 Hz at a temperature of from about −5° C. to about 55° C.

2. The composition of claim 1, wherein said vinylidene chloride-containing polymer latex comprises vinylidene chloride/vinyl chloride/acrylic terpolymer latex.

3. The composition of claim 1, further comprising from about 5 wt % to about 15 wt % hydrocarbon resin latex.

4. The composition of claim 3, wherein said hydrocarbon resin latex comprises aliphatic hydrocarbon resin lattices.

5. The composition of claim 1, further comprising from about 1.0 wt % to about 5.0 wt % of substantially spherical microspheres.

6. The composition of claim 5, wherein said spherical microspheres are selected from the group consisting of spherical micro-balloons and fine particles of ceramic, polymeric and glass, and mixtures thereof.

7. The composition of claim 1, wherein said composition exhibits insertion loss of from about 4 dB to about 15 dB at a frequency of from about 1,000 Hz to about 10,000 Hz at a temperature of from about −5° C. to about 55° C.

8. The composition of claim 1, further comprising an ingredient selected from the group consisting of defoamers, pigments, plastisizers, preservatives, thickeners, surfactants, and mixtures thereof.

9. The composition of claim 1, wherein said filler comprises mica, talc, clay, calcium carbonate, brytes, graphite, and mixtures thereof.

10. The composition of claim 1, wherein said filler comprises mica.

11. The composition of claim 10, wherein said filler comprises talc.

12. The composition of claim 1, wherein said composition has a specific gravity of from about 1.0 to about 1.5.

13. The composition of claim 1, wherein said composition exhibits chip resistance of rating of from about 8 to about 10.

14. The composition of claim 1, wherein said composition exhibits abrasion resistance of at least 40 Kg.

15. The composition of claim 1, wherein said composition exhibits an elongation of from about 50% to about 75%.

16. The composition of claim 1, wherein said composition exhibits dry characteristics of less than 3 hours.

17. An article comprising a substrate and a coating of the composition of claim 1 disposed on at least one surface of said substrate.

18. The article of claim 17, wherein said substrate comprises steel, aluminum, sheet molding compound (SMC) and fiberglass.

19. The article of claim 18, wherein said substrate comprises cold rolled and galvanized steel, primed and painted steel and painted aluminum.

20. A method of improving the sound damping of a substrate, comprising a step of applying the composition of claim 1 to at least one surface of said substrate to form a coating thereon.

21. The method of claim 20, further comprising drying said coating of the composition.

22. The method of claim 21, wherein said drying comprises air-drying at ambient conditions.

23. The method of claim 20, further comprises drying said coating of the composition at a temperature no greater than about 200° F.

24. A waterborne composition comprising
   a) from about 20 wt % to about 40 wt % of a styrene-acrylic latex having a glass transition temperature of from about 0° C. to about 30° C.;
   b) from about 5 wt % to about 20 wt % of a vinylidene chloride-containing polymer latex; and c) from about 20 wt % to about 60 wt % of a filler; and d) from about 5 wt % to about 15 wt % hydrocarbon resin latex comprising aliphatic hydrocarbon resin lattices, wherein said composition exhibits a sound damping property as measured by a composite loss factor of from about 0.02 to about 0.30 at a frequency of from about 200 Hz to about 800 Hz at a temperature of from about −5° C. to about 55° C.; and wherein said aliphatic hydrocarbon resin lattices comprises rosins, rosin esters, and mixtures thereof.

* * * * *